(12) United States Patent
Lee

(10) Patent No.: US 10,139,494 B2
(45) Date of Patent: Nov. 27, 2018

(54) ELECTRONIC DEVICE AND METHOD FOR MEASURING POSITION INFORMATION OF ELECTRONIC DEVICE

(71) Applicant: Samsung Electronics Co., Ltd., Suwon-si, Gyeonggi-do (KR)

(72) Inventor: Yunwoo Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/608,325

(22) Filed: May 30, 2017

(65) Prior Publication Data

US 2017/0261614 A1 Sep. 14, 2017

Related U.S. Application Data

(63) Continuation of application No. 14/739,573, filed on Jun. 15, 2015, now Pat. No. 9,696,428.
(Continued)

(30) Foreign Application Priority Data

Apr. 21, 2015 (KR) ........................ 10-2015-0056026

(51) Int. Cl.
*G01S 19/07* (2010.01)
*G01C 21/16* (2006.01)
(Continued)

(52) U.S. Cl.
CPC ............ *G01S 19/07* (2013.01); *G01C 21/165* (2013.01); *G01S 19/34* (2013.01); *G01S 19/48* (2013.01); *G01S 19/49* (2013.01)

(58) Field of Classification Search
CPC .......... G01S 19/07; G01S 19/34; G01S 19/48; G01S 19/1949; G01C 21/165
(Continued)

(56) References Cited

U.S. PATENT DOCUMENTS 7,612,663 B2 11/2009 Sun
8,362,949 B2 1/2013 Yang et al.
(Continued)

FOREIGN PATENT DOCUMENTS

JP 2012-083323 A 4/2012

OTHER PUBLICATIONS

GAC: Energy-Efficient Hybrid GPS-Accelerometer-Compass GSM Localization, Dec. 6, 2010.

*Primary Examiner* — Marthe Y Marc-Coleman
(74) *Attorney, Agent, or Firm* — Jefferson IP Law, LLP

(57) ABSTRACT

A method of measuring position information of an electronic device is provided. The method includes measuring position information including at least one of a position, a direction of movement, or a distance of movement of the electronic device by using a Global Navigation Satellite System (GNSS) module, measuring at least one of the direction of movement, the distance of movement, or a change of speed of the electronic device by using at least one of a geomagnetic sensor or an accelerometer, calculating the position information based on the information measured by using the GNSS module, and the at least one of the direction of movement, the distance of movement, or the change of speed of the electronic device measured by using the at least one of the geomagnetic sensor or the accelerometer, and adjusting a position information measurement cycle using the GNSS module based on an error of the position information.

37 Claims, 9 Drawing Sheets

Related U.S. Application Data

(60) Provisional application No. 62/014,924, filed on Jun. 20, 2014.

(51) Int. Cl.
  *G01S 19/34* (2010.01)
  *G01S 19/48* (2010.01)
  *G01S 19/49* (2010.01)

(58) Field of Classification Search
  USPC .......................................................... 701/469
  See application file for complete search history.

(56) References Cited

U.S. PATENT DOCUMENTS

| | | | |
|---|---|---|---|
| 2001/0029430 A1 | 10/2001 | Tamura | |
| 2010/0009643 A1* | 1/2010 | Haartsen | H04W 52/0251 455/127.5 |
| 2010/0123623 A1 | 5/2010 | Abraham | |
| 2012/0062414 A1 | 3/2012 | Sambongi | |
| 2012/0191966 A1* | 7/2012 | Jovicic | H04W 8/005 713/100 |

* cited by examiner

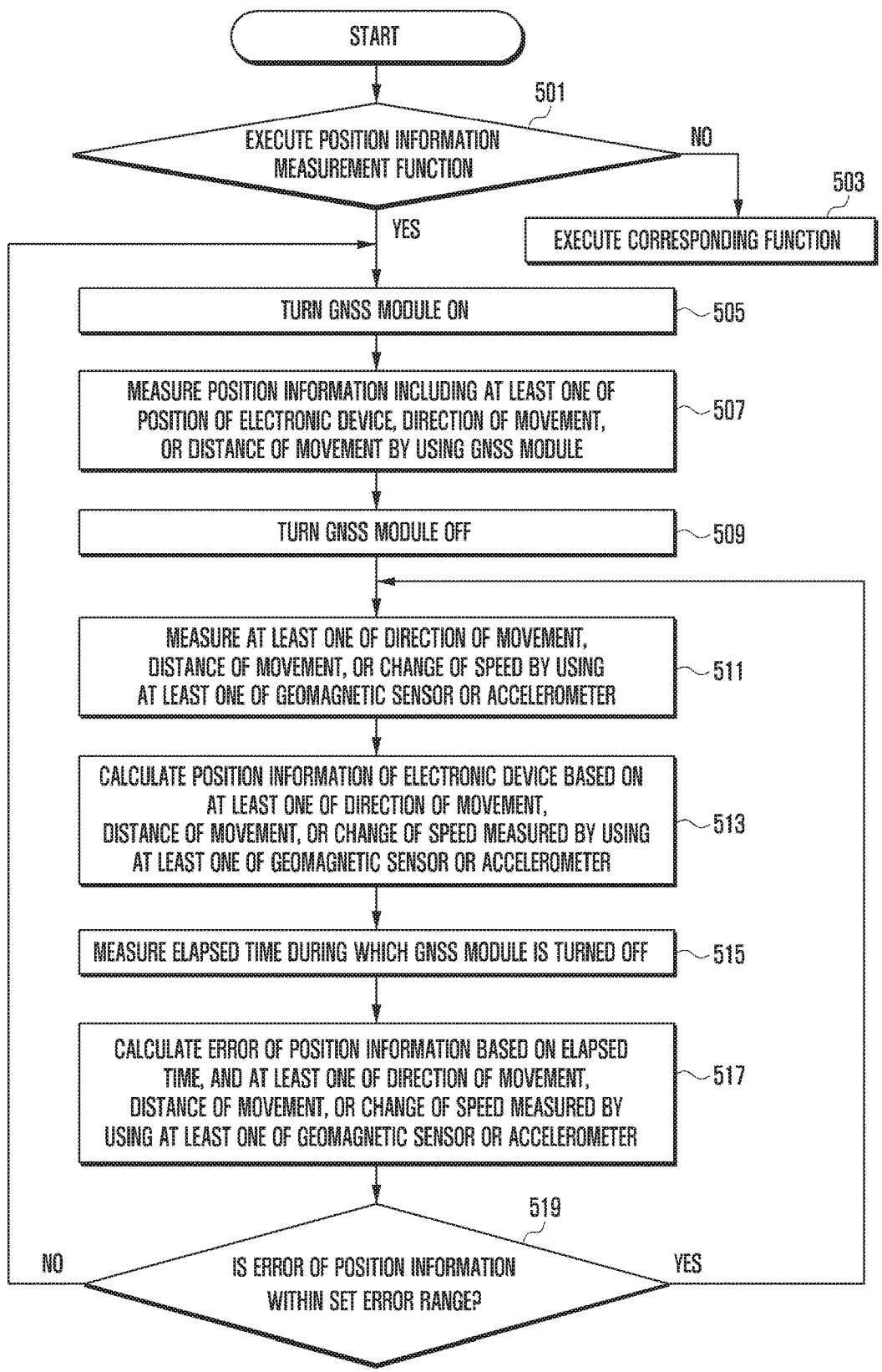

FIG. 6A
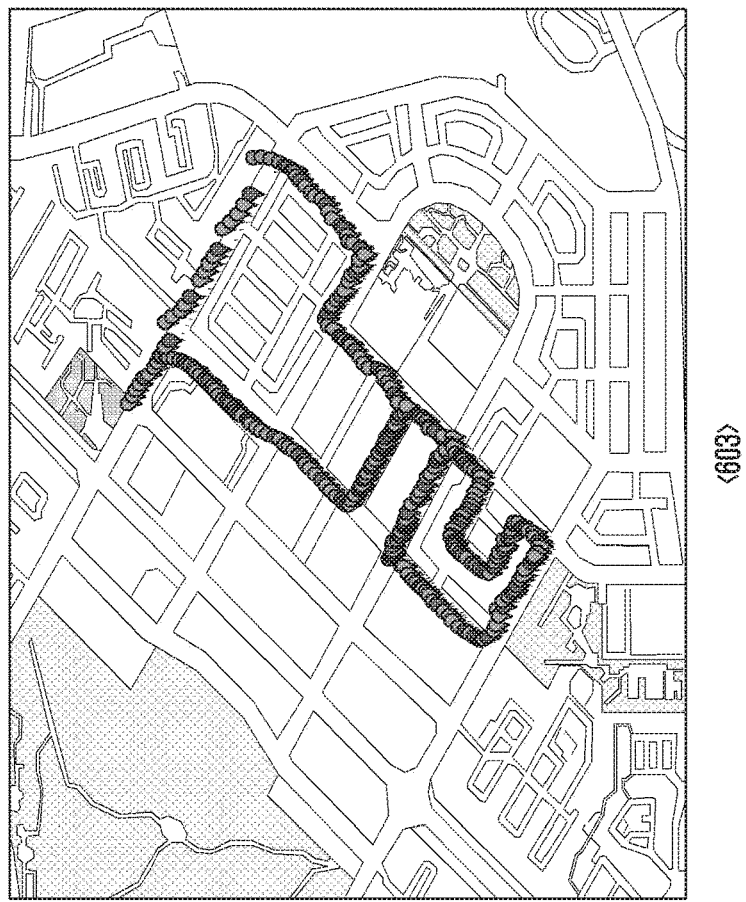
⟨603⟩
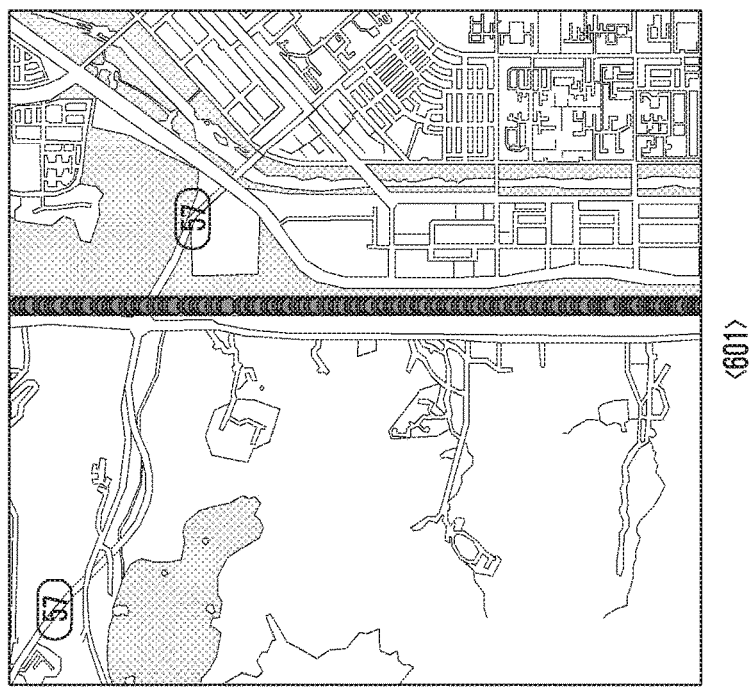
⟨601⟩

FIG. 6B
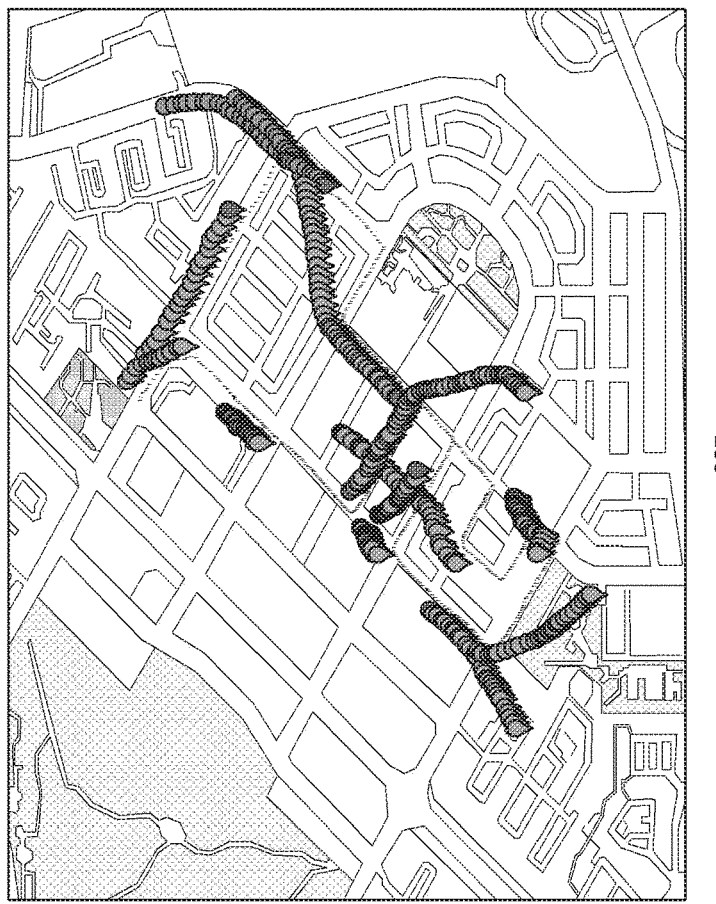
⟨607⟩
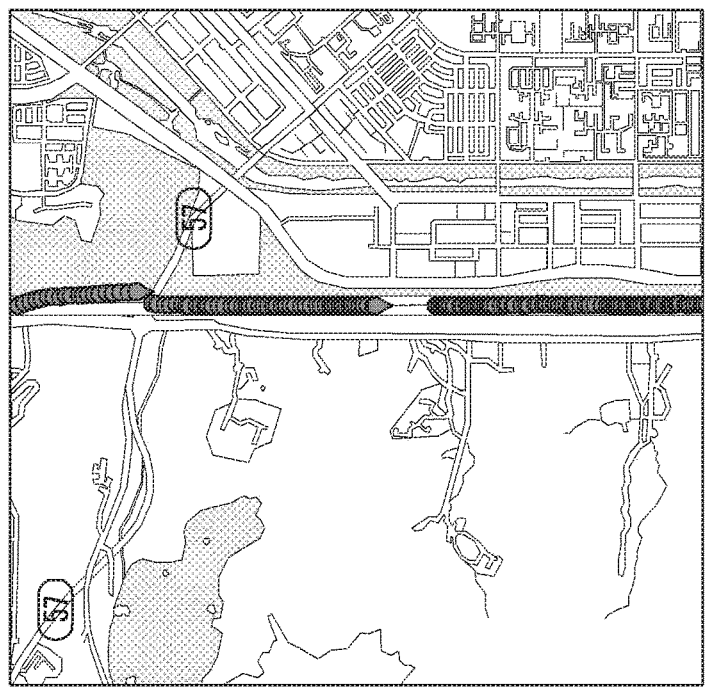
⟨605⟩

FIG. 6C
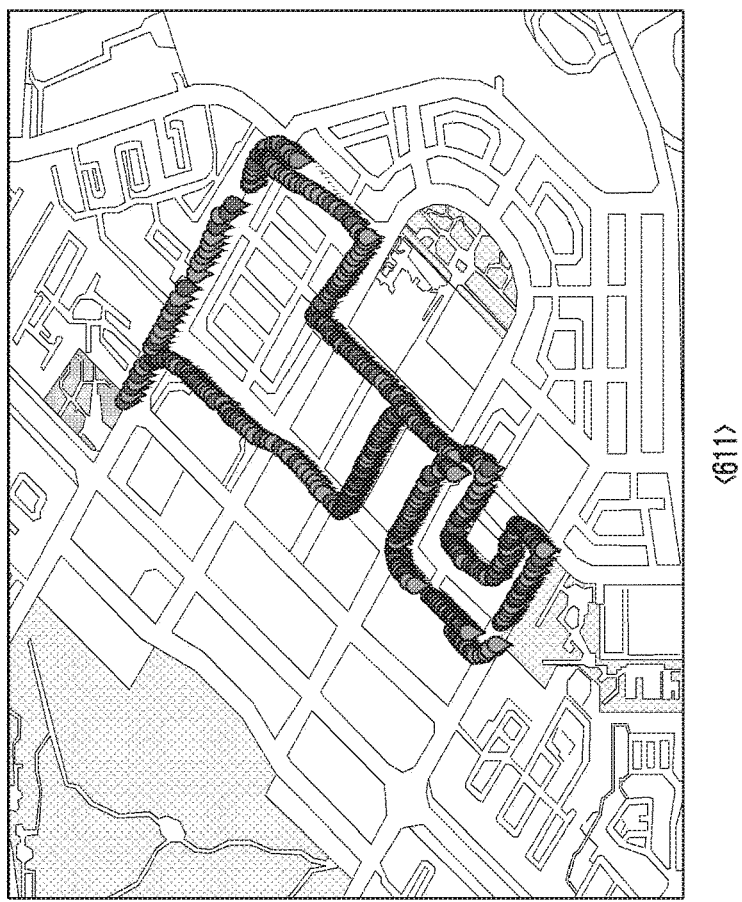
⟨611⟩
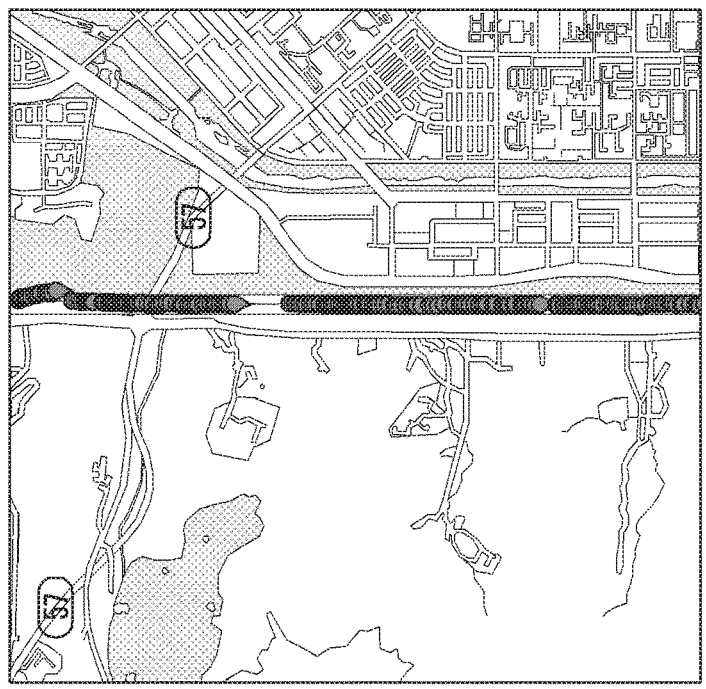
⟨609⟩

ELECTRONIC DEVICE AND METHOD FOR MEASURING POSITION INFORMATION OF ELECTRONIC DEVICE

CROSS-REFERENCE TO RELATED APPLICATION(S)

This application is a continuation application of prior application Ser. No. 14/739,573, filed on Jun. 15, 2015, and claims the benefit under 35 U.S.C. § 119(e) of a U.S. Provisional application filed on Jun. 20, 2014 in the U.S. Patent and Trademark Office and assigned Ser. No. 62/014,924, and under 35 U.S.C. § 119(a) of a Korean patent application filed on Apr. 21, 2015 in the Korean Intellectual Property Office and assigned Serial number 10-2015-0056026, the entire disclosure of each of which is hereby incorporated by reference.

TECHNICAL FIELD

The present disclosure relates to a method of measuring position information of electronic device by using a Global Navigation Satellite System (GNSS), a geomagnetic sensor, and an accelerometer, and an electronic device using the method.

BACKGROUND

An electronic device such as Smart phone, Tablet Personal Computer (PC), Portable Multimedia Player (PMP), Personal Digital Assistant (PDA), Laptop Personal Computer, and a Wearable device such as Wrist watch, and Head-Mounted Display (HMD) may measure position information by using a Global Navigation Satellite System (GNSS) module, a geomagnetic sensor, or an accelerometer included in the electronic device.

When collecting position information by using the GNSS module included in the electronic device, there is a power consumption problem. In addition, when collecting position information by using the geomagnetic sensor, and/or the accelerometer included in the electronic device, there is a problem in that the collected position information of electronic device is incorrect.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for measuring a position of electronic device based on information obtained through a Global Navigation Satellite System (GNSS) module, and/or a geomagnetic sensor, and an accelerometer in an electronic device.

In accordance with an aspect of the present disclosure, a method of measuring position information of an electronic device is provided. The method includes measuring position information including at least one of a position, a direction of movement, or a distance of movement of the electronic device by using a Global Navigation Satellite System (GNSS) module, measuring at least one of the direction of movement, the distance of movement, or a change of speed of the electronic device by using at least one of a geomagnetic sensor or an accelerometer, calculating the position information based on the information measured by using the GNSS module, and the at least one of the direction of movement, the distance of movement, or the change of speed of the electronic device measured by using the at least one of the geomagnetic sensor or the accelerometer, and adjusting a position information measurement cycle using the GNSS module based on an error of the position information.

In accordance with another aspect of the present disclosure, a method of measuring position information of an electronic device is provided. The method includes turning a GNSS module on, when a position information measurement function is executed, measuring position information including at least one of a position, a direction of movement, or a distance of movement of the electronic device by using the GNSS module, turning the GNSS module off, measuring at least one of the direction of movement or a change of speed of the electronic device by using at least one of a geomagnetic sensor or an accelerometer, calculating the position information based on the information measured by using the GNSS module, and the at least one of the direction of movement, the distance of movement, or the change of speed of the electronic device measured by using the at least one of the geomagnetic sensor or the accelerometer, and adjusting a position information measurement activation cycle using the GNSS module based on an error of the position information.

In accordance with another aspect of the present disclosure, an electronic device is provided. The electronic device includes a GNSS module configured to communicate position information of the electronic device, a sensor module including at least one of a geomagnetic sensor or an accelerometer, and a processor configured to measure the position information including at least one of a position, a direction of movement, or a distance of movement of the electronic device by using the GNSS module, measure at least one of the direction of movement or a change of speed of the electronic device by using the at least one of the geomagnetic sensor or the accelerometer, calculate the position information based on the information measured by using the GNSS module, and the at least one of the direction of movement, the distance of movement, and the change of speed of the electronic device measured by using the at least one of the geomagnetic sensor or the accelerometer, and adjusts a position information measurement activation cycle using the GNSS module based on an error of the position information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a flowchart illustrating a position information measurement method of an electronic device according to various embodiments of the present disclosure;

FIGS. 6A, 6B, and 6C are diagrams illustrating an experiment result of position information measurement method of an electronic device according to various embodiments of the present disclosure.

Throughout the drawings, it should be noted that like reference numbers are used to depict the same or similar elements, features, and structures.

DETAILED DESCRIPTION

Figure 1:
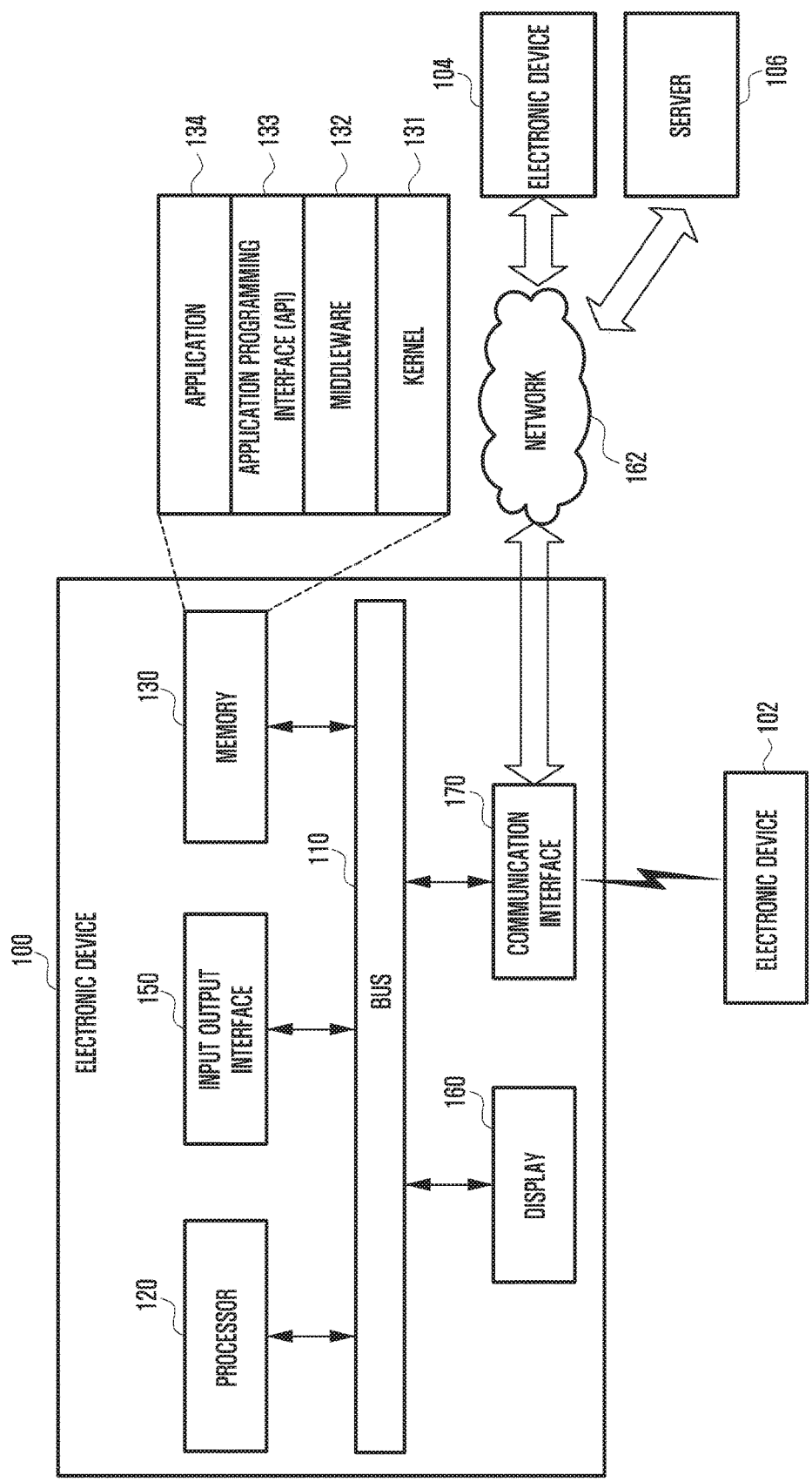
FIG. 1 is a diagram illustrating an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In an embodiment of the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Versatile Disc (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HIVID), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 is a block diagram illustrating a configuration of an electronic device according to an embodiment of the present disclosure.

Referring to FIG. 1, the electronic device 100 includes a bus 110, a processor 120, a memory 130, an input/output interface 150, a display 160, and a communication interface 170.

The bus 110 may be a circuit connecting the above described components and transmitting communication (for example, a control message) between the above described components.

The processor 120 receives commands from other components (for example, the memory 130, the input/output interface 150, the display 160, or the communication interface 170) through the bus 110, analyzes the received commands, and executes calculation or data processing according to the analyzed commands.

The memory 130 stores commands or data received from the processor 120 or other components (for example, the input/output interface 150, the display 160, or the communication interface 170) or generated by the processor 120 or other components. The memory 130 may include programming modules, for example, a kernel 131, middleware 132, an Application Programming Interface (API) 133, and an application 134. Each of the aforementioned programming modules may be implemented by software, firmware, hardware, or a combination of two or more thereof.

The kernel 131 controls or manages system resources (for example, the bus 110, the processor 120, or the memory 130) used for executing an operation or function implemented by the remaining other programming modules, for example, the middleware 132, the API 133, or the application 134. Further, the kernel 131 provides an interface for accessing individual components of the electronic device 100 from the middleware 132, the API 133, or the application 134 to control or manage the components.

The middleware 132 performs a relay function of allowing the API 133 or the application 134 to communicate with the kernel 131 to exchange data. Further, in operation requests received from the application 134, the middleware 132 performs a control for the operation requests (for example, scheduling or load balancing) by using a method of assigning a priority, by which system resources (for example, the bus 110, the processor 120, the memory 130 and the like) of the electronic device 100 can be used, to the application 134.

The API 133 is an interface by which the application 134 can control a function provided by the kernel 131 or the middleware 132 and includes, for example, at least one interface or function (for example, command) for a file control, a window control, image processing, or a character control.

According to various embodiments, the application 134 may include a Short Message Service (SMS)/Multimedia Messaging Service (MIMS) application, an email application, a calendar application, an alarm application, a health care application (for example, application measuring quantity of exercise or blood sugar) or an environment information application (for example, application providing information on barometric pressure, humidity or temperature). Additionally or alternatively, the application 134 may be an application related to an information exchange between the electronic device 100 and an external electronic device (for example, electronic device 102 or electronic device 104). The application related to the information exchange may include, for example, a notification relay application for transferring particular information to the external electronic device or a device management application for managing the external electronic device.

For example, the notification relay application may include a function of transmitting notification information generated by another application (for example, an SMS/MMS application, an email application, a health care application or an environment information application) of the electronic device 100 to the external electronic device (for example, electronic device 102 or electronic device 104). Additionally or alternatively, the notification relay application may receive notification information from, for example, the electronic device 102 or electronic device 104 and provide the received notification information to the user. The device management application may manage (for example, install, remove, or update) at least a part of functions (for example, turning on/off the external electronic device (or some components of the external electronic device) or controlling a brightness of the display) of the external electronic device (104 communicating with the electronic device 101, an application executed in the electronic device 102 or electronic device 104, or a service (for example, call service or message service) provided by the electronic device 102 or electronic device 104.

According to various embodiments, the application 134 may include an application designated according to an attribute (for example, type of electronic device) of the electronic device 102 or electronic device 104. For example, when the electronic device 102 or electronic device 104 is a digital audio player, the application 134 may include an application related to music reproduction. Similarly, when the electronic device 102 or electronic device 104 is a mobile medical device, the application 134 may include an application related to health care. According to an embodiment, the application 134 may include at least one of an application designated to the electronic device 100 and an application received from an external electronic device (for example, server 106, electronic device 102, or electronic device 104). The input/output interface 150 transmits a command or data input from the user through an input/output device (for example, a sensor, a keyboard, or a touch screen) to the processor 120, the memory 130, the communication interface 170, or the display 160 through, for example, the bus 110. For example, the input/output interface 150 may provide data on a user's touch input through a touch screen to the processor 120. Further, the input/output interface 150 may output a command or data received through, for example, the bus 110, from the processor 120, the memory 130, or the communication interface 170 through the input/output device (for example, a speaker or a display). For example, the input/output interface 150 may output voice data processed through the processor 120 to the user through the speaker.

The display 160 displays various pieces of information (for example, multimedia data, text data, or the like) for the user.

The communication interface 170 connects communication between the electronic device 100 and the external device (for example, electronic device 102, electronic device 104, or server 106). For example, the communication interface 170 may access a network 162 through wireless or wired communication to communicate with the external device. The wireless communication includes at least one of, for example, Wireless Fidelity (WiFi), BlueTooth (BT), Near Field Communication (NFC), a GPS, and cellular communication (for example, Long Term Evolution (LTE), LTE-Advanced (LTE-A), Code Division Multiple Access (CDMA), Wideband CDMA (WCDMA), Universal Mobile Telecommunications System (UNITS), Wireless Broadband (WiBro), Global System for Mobile communications (GSM)). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 may be a telecommunication network. The telecommunication network includes at least one of a computer network, Internet, Internet of things, and a telephone network. According to an embodiment, a protocol (for example, transport layer protocol, data link layer protocol, or physical layer protocol) for communication between the electronic device 100 and the external device may be supported by at least one of the application 134, the API 133, the middleware 132, the kernel 131, and the communication interface 170. According to an embodiment, the server 106 supports driving of the electronic device 100 by performing at least one operation (or function) implemented by the electronic device 101. For example, the server 106 may include a communication control server module 108 that supports the communication interface 170 implemented in the electronic device 101. For example, the communication control server module 108 may include at least one of the components of the communication interface 170 to perform (on behalf of) at least one operations performed by the communication interface 170.

Figure 2:
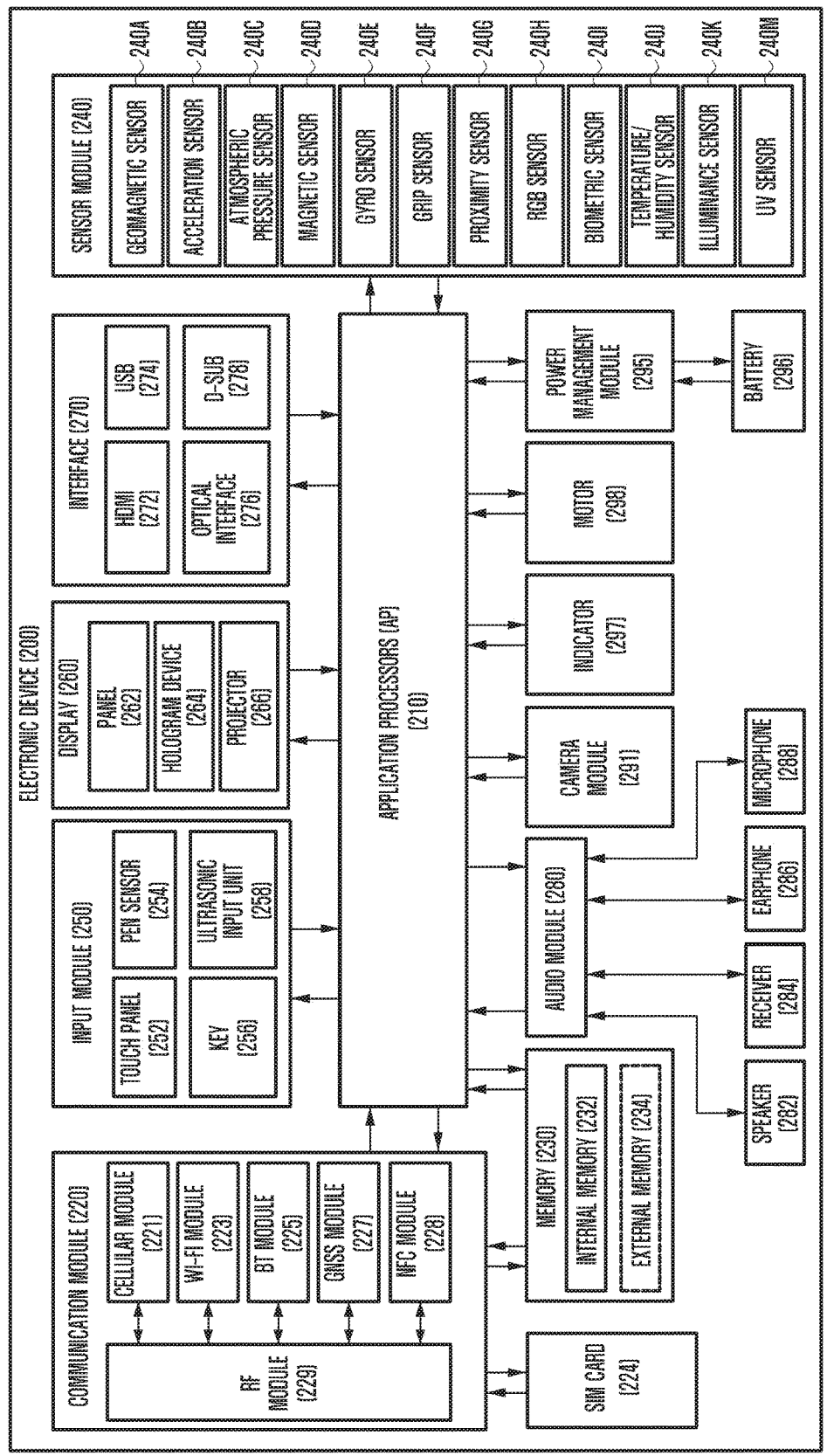
FIG. 2 is a block diagram illustrating an electronic device according to various embodiments of the present disclosure.

FIG. 2 is a block diagram of an electronic device 200 according to various embodiments of the present disclosure. The electronic device 200 may configure, for example, a whole or a part of the electronic device 100 illustrated in FIG. 1. Referring to FIG. 2, the electronic device 200 includes one or more Application Processors (APs) 210, a communication module 220, a Subscriber Identification Module (SIM) card 224, a memory 230, a sensor module 240, an input module 250, a display 260, an interface 270, an audio module 280, a camera module 291, a power management module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment, the AP 210 may further include a Graphic Processing Unit (GPU).

The communication module 220 may have a configuration which is identical with or similar to the communication interface 170 of FIG. 1. The communication module 220 may include, for example, a cellular module 221, a WiFi module 223, a BT module 225, a Global Navigation Satellite System (GNSS) module 227, a NFC module 228, and a radio frequency (RF) module 229.

The Global Navigation Satellite System with which the GNSS module 227 can communicate may be at least one of, for example, a GPS, a Galileo Positioning System, a GLObal NAvigation Satellite System (GLONASS), a Beidou Navigation Satellite System, a Quasi-Zenith Satellite System (QZSS) (or Juntencho), a BDS, a IRNSS, or a DORIS.

The cellular module 221 provides a voice, a call, a video call, a SMS, or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (for example, the SIM card 224). According to an embodiment, the cellular module 221 performs at least some of the functions which can be provided by the AP 210. For example, the cellular module 221 may perform at least some of the multimedia control functions.

According to an embodiment, the cellular module 221 may include a Communication Processor (CP). Further, the cellular module 221 may be implemented by, for example, an SoC.

Although the components such as the cellular module 221 (for example, CP), the memory 230, and the power management module 295 are illustrated as components separate from the AP 210 in FIG. 8, the AP 210 may include at least some (for example, cellular module 221) of the aforementioned components in an embodiment.

According to an embodiment, the AP 210 or the cellular module 221 (for example, CP) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GNSS module 227, and the NFC module 228 may include, for example, a processor for processing data transmitted/received through the corresponding module. Although the cellular module 221, the WiFi module 223, the BT module 225, the GNSS module 227, and the NFC module 228 are illustrated as blocks separate from each other in FIG. 8, at least some (for example, two or more) of the cellular module 221, the WiFi module 223, the BT module 225, the GNSS module 227, and the NFC module 228 may be included in one Integrated Chip (IC) or one IC package according to one embodiment. For example, at least some (for example, the CP corresponding to the cellular module 221 and the WiFi processor corresponding to the WiFi module 223) of the processors corresponding to the cellular module 221, the WiFi module 223, the BT module 225, the GNSS module 227, and the NFC module 228 may be implemented by one SoC.

The RF module 229 transmits/receives data, for example, an RF signal. Although not illustrated, the RF module 229 may include, for example, a transceiver, a Power Amp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire, or the like. Although the cellular module 221, the WiFi module 223, the BT module 225, the GNSS module 227, and the NFC module 228 share one RF module 229 in FIG. 2, at least one of the cellular module 221, the WiFi module 223, the BT module 225, the GNSS module 227, and the NFC module 228 may transmit/receive an RF signal through a separate RF module according to one embodiment.

The SIM card 224 is a card including a Subscriber Identification Module and may be inserted into a slot formed in a particular portion of the electronic device. The SIM card 224 includes unique identification information (for example, Integrated Circuit Card IDentifier (ICCID)) or subscriber information (for example, International Mobile Subscriber Identity (IMSI).

The memory 230 (for example, memory 130) may include an internal memory 232 or an external memory 234. The internal memory 232 may include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 may be a Solid State Drive (SSD). The external memory 234 may further include a flash drive, for example, a Compact Flash (CF), a Secure Digital (SD), a Micro-SD, a Mini-SD, an extreme Digital (xD), or a memory stick. The external memory 234 may be functionally connected to the electronic device 200 through various interfaces. According to an embodiment, the electronic device 200 may further include a storage device (or storage medium) such as a hard drive.

The sensor module 240 may convert the measured or the detected information into an electrical signal by, for example, measuring a physical quantity or detecting the operating state of the electronic device 200. The sensor module 240 may include at least one of, for example, a geomagnetic sensor 240A, an acceleration sensor 240B, an atmospheric pressure sensor 240C, a magnetic sensor 240D, a gyro sensor 240E, a grip sensor 240F, a proximity sensor 240G, a color sensor 240H (e.g. a red, green, blue (RGB) sensor), a biometric sensor 240I, a temperature sensor/humidity sensor 240J, an illuminance sensor 240K, or an ultra violet (UV) sensor 240M. Additionally or alternatively, the sensor module 240 may include, for example, a geo-magnetic sensor, an accelerometer, an E-nose sensor, an electromyography (EMG) sensor, an electroencephalogram (EEG) sensor, an electrocardiogram (ECG) sensor, an infra-red (IR) sensor, an iris sensor, and/or a fingerprint sensor. The sensor module 240 may further include a control circuit for controlling at least one sensor contained in the sensor module. In a certain embodiment, as a part of the AP 210 or separately from the AP 210, electronic device 200 may further include a processor configured to control the sensor module 240, and may control the sensor module 240 in the sleep state of the AP 210.

The input module 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, microphone 288) of the electronic device 200 through an input means generating an ultrasonic signal to identify data and can perform wireless recognition. According to an embodiment, the electronic device 200 receives a user input from an external device (for example, computer or server) connected to the electronic device 200 by using the communication module 220.

The display 260 (for example, display 160) includes a panel 262, a hologram device 264, and a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 200. According to an embodiment, the display 260 may further include a control circuit for controlling the panel 262, the hologram device 264, and the projector 266.

The interface 270 includes, for example, a HDMI 272, a USB 274, an optical interface 276, and a D-subminiature (D-sub) 278. The interface 270 may be included in, for example, the communication interface 170 illustrated in FIG. 1. Additionally or alternatively, the interface 290 may include, for example, a Mobile High-definition Link (MHL) interface, an SD card/Multi-Media Card (MMC), or an Infrared Data Association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment, the camera module 291 may include one or more image sensors (for example, a front sensor or a back sensor), an Image Signal Processor (ISP) (not shown) or a flash (for example, an LED or xenon lamp).

The power management module 295 manages power of the electronic device 200. Although not illustrated, the power management module 295 may include, for example, a Power Management Integrated Circuit (PMIC), a charger IC, or a battery or fuel gauge.

The PMIC may be mounted to, for example, an IC or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 200 by using the stored or generated electricity. The battery 296 may include a rechargeable battery or a solar battery.

The indicator 297 shows particular statuses of the electronic device 200 or a part (for example, AP 210) of the electronic device 200, for example, a booting status, a message status, a charging status and the like. The motor 298 converts an electrical signal to a mechanical vibration.

Although not illustrated, the electronic device 200 may include a processing unit (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
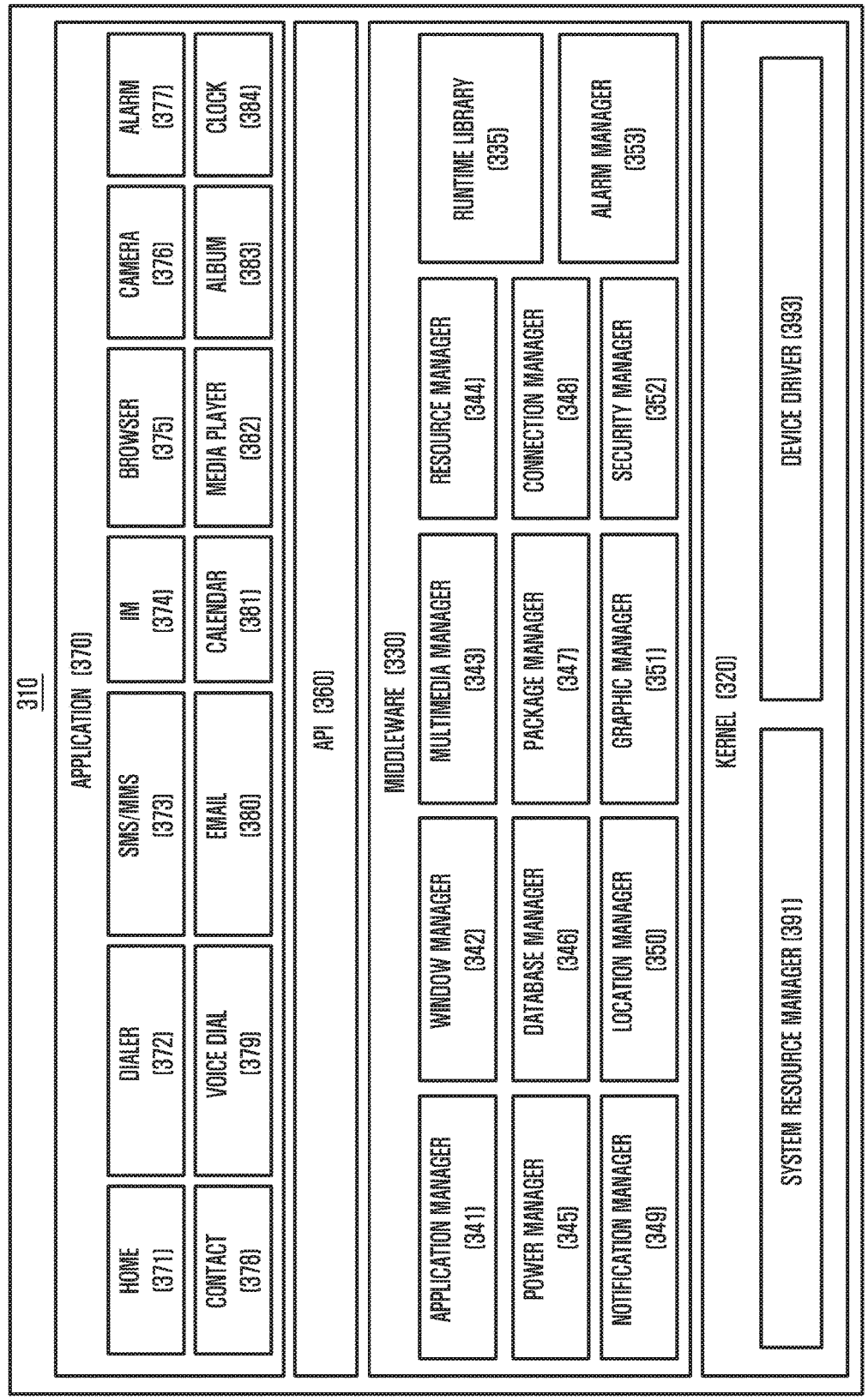
FIG. 3 is a block diagram illustrating a program module according to various embodiments of the present disclosure.

FIG. 3 is a block diagram illustrating a programming module 310 according to an embodiment of the present disclosure.

Referring to FIG. 3, the programming module 310 may be included, e.g. stored, in the electronic device 100, e.g. the memory 130, as illustrated in FIG. 1. At least a part of the programming module 310 may be configured by software, firmware, hardware, and/or combinations of two or more thereof. The programming module 310 may include an OS that is implemented in hardware, e.g., the electronic device 200 to control resources related to an electronic device, e.g., the electronic device 100, and/or various applications. e.g., applications 370, driven on the OS. For example, the OS may be Android, iOS, Windows, Symbian, Tizen, Bada, or the like. Referring to FIG. 3, the programming module 310 may include a kernel 320, middleware 330, an API 360, and the applications 370.

The kernel 320, which may be like the kernel 131, may include a system resource manager 391 and/or a device driver 393. The system resource manager 391 may include, for example, a process manager, a memory manager, and a file system manager. The system resource manager 391 can control, allocate, and/or collect system resources. The device driver 393 may include, for example, a display driver, a camera driver, a Bluetooth driver, a shared memory driver, a USB driver, a keypad driver, a WiFi driver, and an audio driver. Further, according to an embodiment, the device driver 393 may include an Inter-Process Communication (IPC) driver (not illustrated).

The middleware 330 may include a plurality of modules implemented in advance for providing functions commonly used by the applications 370. Further, the middleware 330 can provide the functions through the API 360 such that the applications 370 can efficiently use restricted system resources within the electronic apparatus. For example, as shown in FIG. 3, the middleware 330 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, a security manager 352, and an alarm manager 353.

The runtime library 335 may include a library module that a compiler uses in order to add a new function through a programming language while one of the applications 370 is being executed. According to an embodiment, the runtime library 335 may perform an input/output, memory management, and/or a function for an arithmetic function.

The application manager 341 may manage a life cycle of at least one of the applications 370. The window manager 342 can manage Graphical User Interface (GUI) resources used by a screen. The multimedia manager 343 may detect formats used for reproduction of various media files, and may perform encoding and/or decoding of a media file by using a codec suitable for the corresponding format. The resource manager 344 can manage resources such as a source code, a memory, and a storage space of at least one of the applications 370.

The power manager 345 can manage a battery and/or power, while operating together with a Basic Input/Output System (BIOS), and can provide power information used for operation. The database manager 346 can manage genera-tion, search, and/or change of a database to be used by at least one of the applications 370. The package manager 347 can manage installation and/or an update of an application distributed in a form of a package file.

For example, the connectivity manager 348 can manage wireless connectivity such as Wi-Fi or Bluetooth. The notification manager 349 can display and/or notify of an event, such as an arrival message, a promise, a proximity notification, and the like, in such a way that does not disturb a user. The location manager 350 can manage location information of an electronic apparatus. The graphic manager 351 can manage a graphic effect which will be provided to a user, and/or a user interface related to the graphic effect. The security manager 352 can provide all security functions used for system security and/or user authentication. According to an embodiment, when an electronic apparatus, e.g., the electronic device 100, has a telephone call function, the middleware 330 may further include a telephony manager (not illustrated) for managing a voice and/or video communication function of the electronic apparatus.

The middleware 330 may generate and use a new middleware module through various functional combinations of the aforementioned internal element modules. The middleware 330 can provide modules specialized according to types of OSs in order to provide differentiated functions. Further, the middleware 330 may dynamically remove some of the existing elements and/or add new elements. Accordingly, the middleware 330 may exclude some of the elements described in the various embodiments of the present disclosure, further include other elements, and/or substitute the elements with elements having a different name and performing a similar function.

The API 360, which may be similar to the API 133, is a set of API programming functions, and may be provided with a different configuration according to the OS. For example, in a case of Android or iOS, one API set may be provided for each of platforms, and in a case of Tizen, two or more API sets may be provided.

The applications 370, which may include an application similar to the application 134, may include, for example, a preloaded application and/or a third party application. The applications 370 may include a home application 371 a dialer application 372, a SMS/MMS application 373, an Instant Messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application.

At least a part of the programming module 310 can be implemented by commands stored in non-transitory computer-readable storage media. When the commands are executed by at least one processor, e.g. the AP 210, at least one processor can perform functions corresponding to the commands. The non-transitory computer-readable storage media may be, for example, the memory 204. At least a part of the programming module 310 can be implemented, e.g. executed, by, for example, the AP 210. At least a part of the programming module 310 may include, for example, a module, a program, a routine, a set of instructions and/or a process for performing at least one function.

The titles of the aforementioned elements of the programming module, e.g. the programming module 300, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 4:
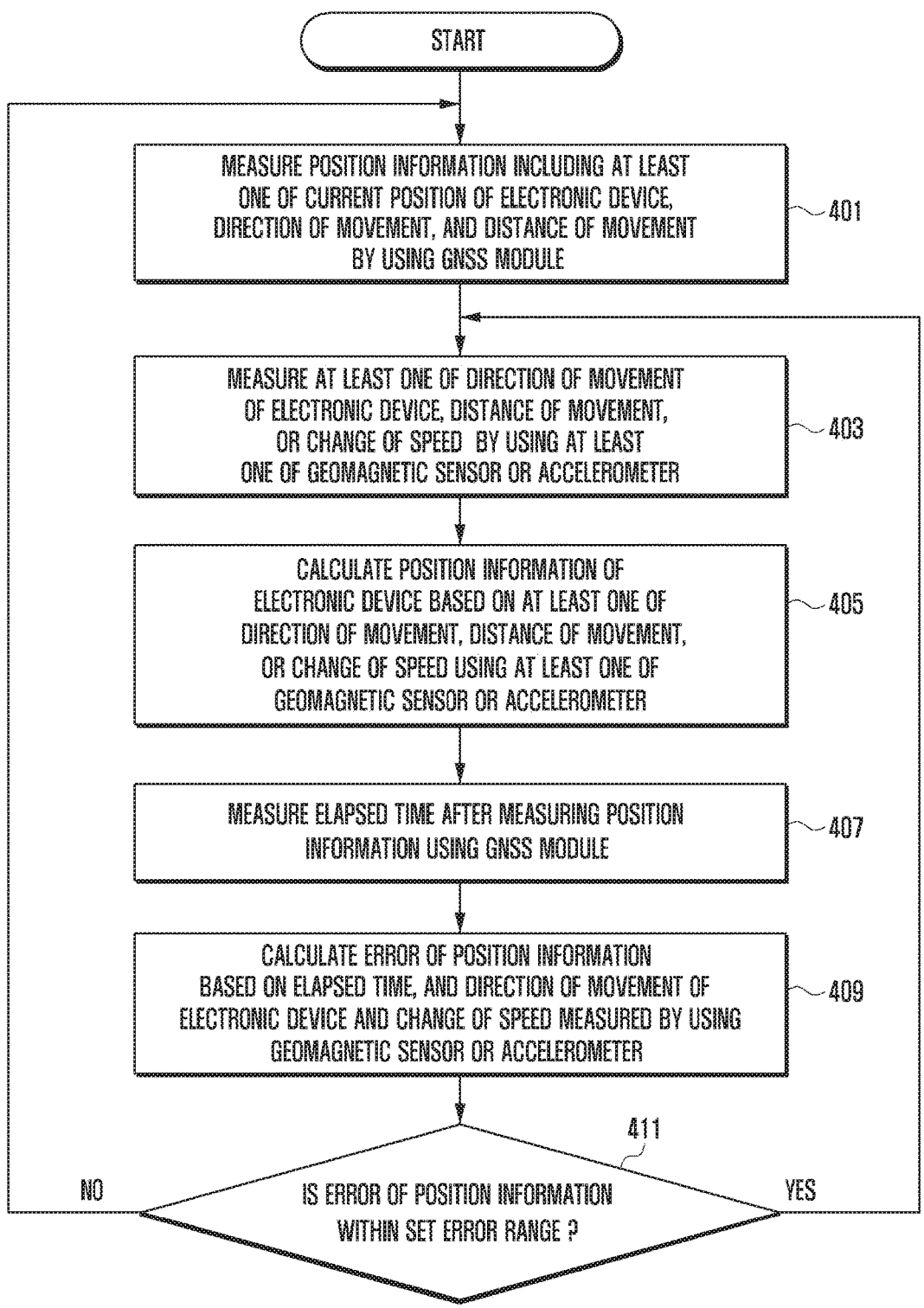
FIG. 4 is a flowchart illustrating a position information measurement method of an electronic device according to various embodiments of the present disclosure.

FIG. 4 is a flowchart illustrating a position information measurement method of an electronic device 200 according to various embodiments of the present disclosure.

Referring to FIG. 4, the electronic device 200 may execute a position information collection function. The position information collection function may measure position information of electronic device at the request of the middleware 132, 330 or the application 134, 370 included in the electronic device 200, and display the measured position information on the display 260 or store the measured position information in the memory 230.

In various embodiments, the position information collection function may measure the position information of the electronic device according to a user input requesting the position information collection function, and display the measured position information on the display 260 or store the measured position information in the memory 230.

The electronic device 200 may process the measured position information through the API 133, 360 by using the AP 210 or the processor 120, and then display it on the application being executed.

The electronic device 200 may store the measured position information in the memory 230. The electronic device 200 may calculate an error range of the measured position information through the AP 210 or the processor 120 based on the measured position information, and may compare it with a preset error range.

At operation 401, the electronic device 200 may measure the position information of electronic device 200 including at least one of a position, a direction of movement, and a distance of movement of the electronic device 200 by using the GNSS module 227.

The position, the direction of movement, and the distance of movement of the electronic device 200 measured by the electronic device 200 using the GNSS module 227 may be displayed on the display 260 or stored in the memory 230 under the control of the processor 120 or the AP 210.

At operation 403, the electronic device 200 may measure at least one of the direction of movement, the distance of movement, and a change of speed of the electronic device 200 by using at least one of the geomagnetic sensor 240A and the accelerometer 240B. At operation 405, the electronic device 200 may measure the direction of movement of the electronic device 200 by using the geomagnetic sensor 240A, and measure the change of speed by using the accelerometer 240B.

When measuring at least one of the direction of movement and the change of speed of the electronic device 200 by using at least one of the geomagnetic sensor 240A and the accelerometer 240B, the electronic device 200 may remove an acceleration change due to gravitational acceleration or remove a noise by using a low pass filter (LPF), in order to remove the noise generated in the geomagnetic sensor 240A or the accelerometer 240B.

At operation 405, the electronic device 200 may calculate the position information of the electronic device 200 through the processor 120 or the AP 210, based on at least one of the direction of movement, the distance of movement, and the change of speed of the electronic device 200 measured by the electronic device 200 using at least one of the geomagnetic sensor 240A and the accelerometer 240B.

The position information calculated based on at least one of the direction of movement, the distance of movement, or the change of speed of the electronic device 200 measured by the electronic device 200 using at least one of the geomagnetic sensor 240A and the accelerometer 240B may be displayed on the display 260 or be stored in the memory 230 under the control of the processor 120 or the AP 210.

After measuring the position information of the electronic device 200 including at least one of the position, the direction of movement, and the distance of movement of the electronic device 200 by using the GNSS module 227, the electronic device 200 does not use the GNSS module 227. At operation 407, after measuring the position information of the electronic device 200 including at least one of the position, the direction of movement, and the distance of movement by using the GNSS module 227, the electronic device 200 of the electronic device 200 may measure an elapsed time of not using the GNSS module 227.

At operation 409, through the AP 210 or the processor 120, the electronic device 200 may calculate an error of the position information based on the elapsed time after measuring the position information using the GNSS module, the direction of movement of the electronic device 200, and the change of speed of the electronic device 200 measured by the electronic device 200 using the geomagnetic sensor 240A or the accelerometer 240B.

The method of calculating the error of position information is shown in Equation 1.

$$\text{Elapsed time}*a+\text{change of speed}*b+\text{direction of movement}*c=\text{error}, (a,b,c>0) \qquad \text{Equation 1}$$

Constants a, b, c may be calculated through a mathematical modeling. The constants a, b, c may be information on a weighting for the elapsed time, the change of speed, and the direction of movement which are variable in the process of calculating the error of position information.

At operation 411, through the AP 210 or the processor 120, the electronic device 200 may determine whether the calculated error of position information is within a set error range.

If the calculated error of position information is within the set error range, it proceeds to operation 403, and if the calculated error of position information exceeds the set error range, it proceeds to operation 401.

At operation 409 and operation 411, the electronic device 200 may determine whether any one of the elapsed time which is a time of measuring the position information through the GNSS module 227, the direction of movement of the electronic device 200 measured through the geomagnetic sensor 240A, and the change of speed of the electronic device 200 measured through the accelerometer 240B exceeds a set measurement range, and if it is within the set measurement range, it proceeds to operation 403, and if it exceeds the set measurement range, it proceeds to operation 401.

In various embodiments of the present disclosure, while calculating the position information of the electronic device 200 by using the geomagnetic sensor 240A or the accelerometer 240B, the electronic device 200 may calculate the position information through the GNSS module 227 when the change of speed of the electronic device 200 is abrupt or the change in the direction of movement of the electronic device 200 is abrupt even though the elapsed time does not reach a set time after measuring the position information.

Alternatively, while calculating the position information of the electronic device 200 using the geomagnetic sensor 240A or the accelerometer 240B, when the elapsed time reaches the set time, the electronic device 200 may calculate the position information by using the GNSS module 227.

The electronic device 200 may measure the position information using the GNSS module 227 at every set elapsed time. Further, even before the set elapsed time, the electronic device 200 may measure the position information by using the GNSS module 227 even before the elapsed time if the change in the position information measured by using the geomagnetic sensor 240A or the accelerometer 240B is abrupt.

Since the electronic device 200, through the AP 210 or the processor 120, at operations 409 and 411, calculates the error of the position information based on the elapsed time, and at least one of the direction of movement, the distance of movement, or the change of speed of the electronic device 200 measured by using at least one of the geomagnetic sensor 240A, or the accelerometer 240B, and determines whether to calculate the error of the position information by using the GNSS module 227 on the basis of the calculated error, it may variably adjust the position information measurement cycle using the GNSS module 227 or the activation cycle of the GNSS module 227.

FIG. 5 is a flowchart illustrating a position information measurement method of an electronic device according to various embodiments of the present disclosure.

Referring to FIG. 5, the electronic device 200 may execute a position information collection function. The position information collection function may measure the position information of the electronic device at the request of the application 134, 370 or the middleware 132, 330 included in the electronic device 200, and display the measured position information on the display 260 or store in the memory 230.

In various embodiments, the position information collection function may measure the position information of the electronic device according to a user input requesting the position information collection function, and display the measured position information on the display 260 or store in the memory 230.

The electronic device 200 may display the measured position information on the application being executed 134, 370 after processing it through the API 133, 360 by using AP 210 or the processor 120.

The electronic device 200 may store the measured position information in the memory 230. The electronic device 200 may calculate the error range of the measured position information through the AP 210 or the processor 120 based on the measured position information, and may compare with a preset error range.

At operation 501, the electronic device 200 may determine whether to execute the position information measurement function. If the position information measurement function is not executed, it proceeds to operation 503 to execute a corresponding function or to perform the function being executed.

When the position information measurement function is executed, the electronic device 200 may turn the GNSS module 227 on at operation 505.

When the GNSS module 227 is turned on, at operation 507, the electronic device 200 may measure the position information of the electronic device 200 including at least one of the position, the direction of movement, or the distance of movement of the electronic device 200 by using the GNSS module 227.

When the position information of the electronic device 200 including at least one of the, the direction of movement, or the distance of movement of the electronic device 200 is measured by using the GNSS module 227, the electronic device 200 may turn the GNSS module 227 off at operation 509.

At operation 511, the electronic device 200 may measure at least one of the direction of movement, the distance of movement, or the change of speed of the electronic device 200 by using at least one of the geomagnetic sensor 240A or the accelerometer 240B. At operation 513, the electronic device 200 may measure the direction of movement of the electronic device 200 by using the geomagnetic sensor 240A, and measure the change of speed by using the accelerometer 240B.

At operation 513, the electronic device 200 may calculate the position information of the electronic device 200 through the processor 120 or the AP 210, based on at least one of the direction of movement, the distance of movement, or the change of speed of the electronic device 200 measured by using at least one of the geomagnetic sensor 240A or the accelerometer 240B.

The position information calculated based on at least one of the direction of movement, the distance of movement, or the change of speed of the electronic device 200 measured by using at least one of the geomagnetic sensor 240A or the accelerometer 240B may be displayed on the display 260 or be stored in the memory 230 under the control of the processor 120 or the AP 210.

At operation 515, the electronic device 200 may measure the elapsed time during which the GNSS module 227 is turned off.

At operation 517, through the processor 120 or the AP 210, the electronic device 200 may calculate an error of the position information based on the elapsed time, and at least one of the direction of movement, the distance of movement, or the change of speed of the electronic device 200 measured by using at least one of the geomagnetic sensor 240A, or the accelerometer 240B.

The method of calculating the error of position information is shown in Equation 2.

$$\text{Elapsed time}*a + \text{change of speed}*b + \text{direction of movement}*c = \text{error}, (a,b,c>0) \quad \text{Equation 2}$$

Constants a, b, c may be calculated through a mathematical modeling. The constants a, b, c may be information on a weighting for the elapsed time, the change of speed, and the direction of movement which are variable in the process of calculating the error of position information.

At operation 519, through the processor 120 or the AP 210, the electronic device 200 may determine whether the calculated error of position information is within a set error range.

If the calculated error of position information is within the set error range, it proceeds to operation 511, and if the calculated error of position information exceeds the set error range, it proceeds to operation 505.

At operation 517 and operation 519, the electronic device 200 may determine whether any one of the elapsed time which is a time of measuring the position information through the GNSS module 227, the direction of movement measured through the geomagnetic sensor 240A, and the change of speed of the electronic device 200 measured through the accelerometer 240B exceeds a set measurement range, and if it is within the set measurement range, it proceeds to operation 511, and if it exceeds the set measurement range, it proceeds to operation 505.

In various embodiments of the present disclosure, while calculating the position information of the electronic device 200 by using at least one of the geomagnetic sensor 240A or the accelerometer 240B, the electronic device 200 may calculate the position information through the GNSS module 227 when the change of speed of the electronic device 200 is abrupt or the change in the direction of movement of the electronic device 200 is abrupt even though the elapsed time does not reach a set time after measuring the position information.

Since the electronic device 200, through the AP 210 or the processor 120, at operations 517 and 519, calculates the error of the position information based on the elapsed time, and at least one of the direction of movement, the distance of movement, or the change of speed of the electronic device 200 measured by using at least one of the geomagnetic sensor 240A or the accelerometer 240B, and determines whether to calculate the error of the position information by using the GNSS module 227 based on the calculated error, it may variably adjust the position information measurement cycle using the GNSS module 227 or the activation cycle of the GNSS module 227.

Alternatively, while calculating the position information of the electronic device 200 by using the geomagnetic sensor 240A or the accelerometer 240B, when the elapsed time reaches the set time, the electronic device 200 may calculate the position information through the GNSS module 227.

The electronic device 200 may measure the position information obtained by using the GNSS module 227 at every set elapsed time. Further, even before the set elapsed time, the electronic device 200 may measure the position information by using the GNSS module 227 even before the elapsed time if the change in the position information measured by using the geomagnetic sensor 240A or the accelerometer 240B is abrupt.

FIGS. 6A to 6C are a diagram illustrating an experiment result obtained by comparing the position information measurement method of an electronic device 200 according to various embodiments of the present disclosure with the position information measurement method according to the related art.

FIGS. 6A and 6B are a diagram illustrating a result of measuring the position information by using the GNSS module 227 at every fixed cycle (epoch) according to the position information measuring method according to the related art.

Referring to FIG. 6A, when measuring the position information of the electronic device 200 by using the GNSS module 227 every 5 seconds, the electronic device may measure the position information that matches the actual movement of the electronic device 200 as shown in reference numeral 601 that measures the position information of the electronic device 200 on the highway and shown in reference numeral 603 that measures the position information of the electronic device 200 in the downtown area. However, since the frequency of use of the GNSS module 227 in FIG. 6A is highest among the experimental results of FIGS. 6A to 6C, the power consumption of the electronic device 200 may be highest among the experiment results of FIGS. 6A to 6C.

Referring to FIG. 6B, when measuring the position information of the electronic device 200 by using the GNSS module 227 every 50 seconds, the electronic device may measure the position information that matches the actual movement of the electronic device 200 as shown in reference numeral 605 that measures the position information of the electronic device 200 on the highway. However, in the downtown area where the change of the direction of movement or the change of the acceleration occurs frequently, the position information may be inaccurate as the position information that does not match the actual movement of the electronic device 200 is measured as shown in reference numeral 607.

FIG. 6C is a diagram illustrating a result of measuring the position information according to the position information measurement method of the electronic device 200 according to various embodiments of the present disclosure.

Referring to FIG. 6C, when the electronic device 200 measures the position information as a reference by using the GNSS module 227 according to variable time (or, dynamic measurement time), and calculates the position information of the electronic device 200 by using the geomagnetic sensor 240A or the accelerometer 240B, the electronic device 200 may measure the position information that matches the actual movement of the electronic device 200 as shown in reference numeral 609 that measures the position information of the electronic device 200 on the highway and shown in reference numeral 611 that measures the position information of the electronic device 200 in the downtown area.

The experiment result obtained by comparing the position information measurement method of an electronic device 200 according to various embodiments of the present disclosure with the position information measurement method according to the related art, which are disclosed in FIGS. 6A to 6C, is expressed in Table 1.

TABLE 1

| GNSS module | Highway | | Downtown area | |
| --- | --- | --- | --- | --- |
| position measurement cycle (Epoch Length) | Frequency of use of GNSS module | Root mean square error (RMSE) | Frequency of use of GNSS module | Root mean square error (RMSE) |
| Constantly measure every 5 seconds (FIG. 6A) | 20% | 6M | 20% | 2M |
| Constantly measure every 50 seconds (FIG. 6B) | 2% | 109M | 2% | 48M |
| Dynamically measure as in the present disclosure (FIG. 6C) | 8.6% | 31M | 12% | 3.5M |

According to the related art of FIGS. 6A and 6B, the accuracy of the position information is dependent on the cycle of measurement time through the GNSS module 227 as the GNSS module 227 is constantly used regardless of the change of the direction of movement of the electronic device 200, and the change of acceleration, and the accuracy of the position information increases as the cycle of measurement time through the GNSS module 227 becomes shorter. Therefore, it is disadvantageous in that the power consumption of the electronic device 200 increases so to improve the accuracy of position information.

According to various embodiments of the present disclosure, as shown in FIG. 6C, the frequency of use of the GNSS module 227 increases when the change of the direction of movement of the electronic device 200, and the change of acceleration increases, whereas the frequency of use of the GNSS module 227 decreases when the change of the direction of movement of the electronic device 200, and the change of acceleration decreases. Therefore, the power consumption of the electronic device 200 decreases as the position information is measured by using the GNSS module 227 dynamically, and the accuracy of the position information may also be maintained.

Figure 7:
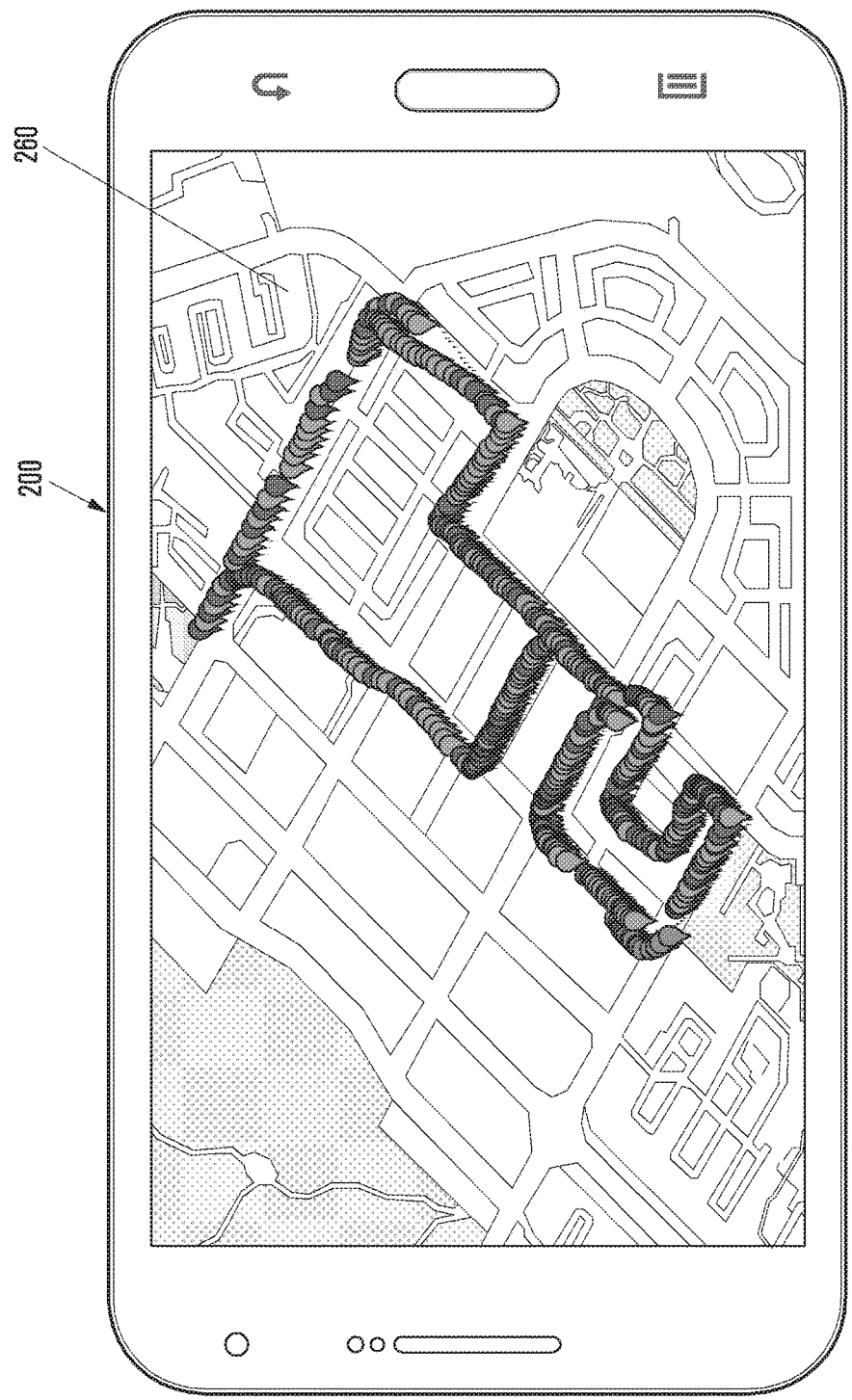
FIG. 7 is a diagram illustrating an electronic device displaying measured position information according to various embodiments of the present disclosure.

FIG. 7 is a diagram illustrating an electronic device 200 displaying measured position information according to various embodiments of the present disclosure.

Referring to FIG. 7, the electronic device 200 may display the measured position information on the application execution screen of the display 260 such as a navigation application and a map application. In addition, the electronic device 200 may store and record the measured position information in the memory 230.

An apparatus and a method for measuring position information of electronic device according to various embodiments of the present disclosure may measure position information of electronic device based on position information of electronic device measured through the GNSS module, and/or position information of electronic device measured through the geomagnetic sensor, and the accelerometer, thereby measuring exact position information of electronic device and reducing power consumption of electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device comprising:
a global navigation satellite system (GNSS) module;
one or more sensors; and
a processor adapted to:
identify, using the GNSS module, a first position of the portable communication device,
in response to identifying the first position using the GNSS module, inactivate the GNSS module and detect, using at least one sensor of the one or more sensors, a motion or a direction of the portable communication device, and
adjust a duty cycle to be used for the GNSS module to update a position for the portable communication device from the first position to a second position, the adjusting based at least in part on the motion or the direction of the portable communication device.

2. The portable communication device of claim 1, wherein the processor is further adapted to:
determine at least one portion of the motion or at least one portion of the direction of the portable communication device moved relative to the first position, and
perform the adjusting of the duty cycle based on the at least one portion of the motion or the at least one portion of the direction.

3. The portable communication device of claim 1, wherein the processor is further adapted to:
determine the second position of the portable communication device moved from the first position based at least in part on the motion or the direction.

4. The portable communication device of claim 1, wherein the processor is further adapted to:
inactivate the GNSS module at least temporarily before the adjusting of the duty cycle.

5. The portable communication device of claim 1, wherein the processor is further adapted to:
refrain from updating the position for a specified period of time corresponding to the duty cycle determined based at least in part on an outcome of the adjusting.

6. The portable communication device of claim 5, wherein the processor is further adapted to:
reactivate the GNSS module to update the position after the specified period of time.

7. The portable communication device of claim 1, wherein the processor is further adapted to:
increase, as at least part of the adjusting of the duty cycle, a frequency at which the GNSS module is to be activated.

8. An integrated chip operable at a portable communication device, the integrated chip comprising:
a processor adapted to:
identify, using a global navigation satellite system (GNSS) module operatively coupled with the processor, a first position of the portable communication device,
in response to identifying the first position using the GNSS module, inactivate the GNSS module and detect, using at least one sensor of one or more sensors operatively coupled with the processor, a motion or a direction of the portable communication device, and
adjust a duty cycle to be used for the GNSS module to update a position for the portable communication device from the first position to a second position, the adjusting based at least in part on the motion or the direction of the portable communication device.

9. The integrated chip of claim 8, wherein the processor is further adapted to:
determine at least one portion of the motion or at least one portion of the direction of the portable communication device moved relative to the first position, and
perform the adjusting of the duty cycle based on the at least one portion of the motion or the at least one portion of the direction.

10. The integrated chip of claim 8, wherein the processor is further adapted to:
determine the second position of the portable communication device moved from the first position based at least in part on the motion or the direction.

11. The integrated chip of claim 8, wherein the processor is further adapted to:
inactivate the GNSS module at least temporarily before the adjusting of the duty cycle.

12. The integrated chip of claim 8, wherein the processor is further adapted to:
refrain from updating the position for a specified period of time corresponding to the duty cycle determined based at least in part on an outcome of the adjusting.

13. The integrated chip of claim 12, wherein the processor is further adapted to:
reactivate the GNSS module to update the position after the specified period of time.

14. A non-transitory machine-readable storage device storing instructions that, when executed by one or more processors, cause the one or more processors to perform operations comprising:
identifying, using a global navigation satellite system (GNSS) module operatively coupled with the one or more processors, a first position of a portable communication device;
in response to identifying the first position using the GNSS module, inactivating the GNSS module and detecting, using at least one sensor of one or more sensors operatively coupled with the one or more processors, a motion or a direction of the portable communication device; and adjusting a duty cycle to be used for the GNSS module to update a position for the portable communication device from the first position to a second position, the adjusting based at least in part on a motion or a direction of the portable communication device.

15. The non-transitory machine-readable storage device of claim 14, wherein the operations further comprise:
determining at least one portion of the motion or at least one portion of the direction of the portable communication device moved relative to the first position; and
performing the adjusting of the duty cycle based on the at least one portion of the motion or the at least one portion of the direction.

16. The non-transitory machine-readable storage device of claim 14, wherein the operations further comprise:
determining the second position of the portable communication device moved from the first position based at least in part on the motion or the direction.

17. The non-transitory machine-readable storage device of claim 14, wherein the operations further comprise:
inactivating the GNSS module at least temporarily before the adjusting of the duty cycle.

18. The non-transitory machine-readable storage device of claim 14, wherein the operations further comprise:
refraining from updating the position for a specified period of time corresponding to the duty cycle determined based at least in part on an outcome of the adjusting.

19. The non-transitory machine-readable storage device of claim 18, wherein the operations further comprise:
reactivating the GNSS module to update the position after the specified period of time.

20. A portable communication device comprising:
a global navigation satellite system (GNSS) module;
one or more sensors; and
a processor adapted to:
activate the GNSS module to identify a first position of the portable communication device,
in response to identifying the first position using the GNSS module, inactivate the GNSS module and detect, using at least one sensor of the one or more sensors, a motion or a direction of the portable communication device, and
reactivate the GNSS module to update a position for the portable communication device from the first position to a second position, the reactivating based at least in part on the motion or the direction of the portable communication device.

21. The portable communication device of claim 20, wherein the processor is further adapted to:
determine at least one portion of the motion or at least one portion of the direction of the portable communication device moved relative to the first position, and
perform the adjusting of the duty cycle based on the at least one portion of the motion or the at least one portion of the direction.

22. The portable communication device of claim 20, wherein the processor is further adapted to:
inactivate the GNSS module after the identifying of the first position.

23. The portable communication device of claim 20, wherein the processor is further adapted to:
identify, as at least part of the updating of the position, a change in a position of the portable communication device relative to the first position based at least in part on the motion or the direction.

24. The portable communication device of claim 23, wherein the processor is further adapted to:
perform the reactivating of the GNSS module based at least in part on a determination that an accuracy with respect to the identifying of the change does not correspond to a specified condition.

25. The portable communication device of claim 24, wherein the processor is further adapted to:
refrain from reactivating the GNSS module based at least in part on a determination that the accuracy corresponds to the specified condition.

26. The portable communication device of claim 20, wherein the processor is further adapted to:
perform the reactivating of the GNSS module further based on time data obtained using the GNSS module.

27. The portable communication device of claim 23, wherein the processor is further adapted to:
identify the change in the position relative to the second position.

28. An integrated chip operable at a portable communication device, the integrated chip comprising:
a processor adapted to:
activate a global navigation satellite system (GNSS) module operatively coupled with the processor to identify a first position of the portable communication device,
in response to identifying the first position using the GNSS module, inactivate the GNSS module and detect, using at least one sensor of one or more sensors operatively coupled with the processor, a motion or a direction of the portable communication device, and
reactivate the GNSS module to update a position for the portable communication device from the first position to a second position, the reactivating based at least in part on the motion or the direction of the portable communication device.

29. The integrated chip of claim 28, wherein the processor is further adapted to:
determine at least one portion of the motion or at least one portion of the direction of the portable communication device moved relative to the first position, and
perform the adjusting of the duty cycle based on the at least one portion of the motion or the at least one portion of the direction.

30. The integrated chip of claim 28, wherein the processor is further adapted to:
inactivate the GNSS module at least temporarily after the first position is identified and before the position is updated from the first position to the second position.

31. The integrated chip of claim 28, wherein the processor is further adapted to:
identify, as at least part of the updating of the reference position, a change in a position of the portable communication device relative to the first position based at least in part on the motion or the direction.

32. The integrated chip of claim 31, wherein the processor is further adapted to:
perform the reactivating of the GNSS module based at least in part on a determination that an accuracy with respect to the identifying of the change does not correspond to the specified condition.

33. The integrated chip of claim 32, wherein the processor is further adapted to:

refrain from reactivating the GNSS module based at least in part on a determination that the accuracy corresponds to the specified condition.

34. A non-transitory machine-readable storage device storing instructions that, when executed by one or more processors, cause the one or more processors to perform operations comprising:
    activating a global navigation satellite system (GNSS) module operatively coupled with the one or more processors to identify a first position of an portable communication device;
    in response to identifying the first position using the GNSS module, inactivating the GNSS module and detecting, using at least one sensor of one or more sensors operatively coupled with the one or more processors, a motion or a direction of the portable communication device; and
    reactivating the GNSS module to update a position for the portable communication device from the first position to a second position, the reactivating based at least in part on the motion or the direction of the portable communication device moved relative to the first position.

35. The non-transitory machine-readable storage device of claim 34, wherein the operations further comprise:
    determining at least one portion of the motion or at least one portion of the direction of the portable communication device moved relative to the first position; and
    performing the adjusting of the duty cycle based on the at least one portion of the motion or the at least one portion of the direction.

36. The non-transitory machine-readable storage device of claim 34, wherein the operations further comprise:
    inactivating the GNSS module after the identifying of the first position.

37. The non-transitory machine-readable storage device of claim 34, wherein the operations further comprise:
    adjusting, as at least part of the reactivating, a frequency at which the GNSS module is to be activated.

* * * * *